US012694117B2

(12) United States Patent
Yokota

(10) Patent No.: US 12,694,117 B2
(45) Date of Patent: Jul. 28, 2026

(54) SECURITY METHOD AND SECURITY DEVICE

(71) Applicant: Panasonic Intellectual Property Management Co., Ltd., Osaka (JP)

(72) Inventor: Kaoru Yokota, Hyogo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 305 days.

(21) Appl. No.: 18/143,344

(22) Filed: May 4, 2023

(65) Prior Publication Data

US 2023/0401317 A1      Dec. 14, 2023

(30) Foreign Application Priority Data

May 18, 2022      (JP) ................................. 2022-081617

(51) Int. Cl.
*G06F 21/57* (2013.01)
*G06F 8/65* (2018.01)
*H04L 9/40* (2022.01)

(52) U.S. Cl.
CPC .............. *G06F 21/572* (2013.01); *G06F 8/65* (2013.01); *H04L 63/1425* (2013.01); *H04L 63/1441* (2013.01); *G06F 2221/033* (2013.01)

(58) Field of Classification Search
CPC .... G06F 21/572; G06F 8/65; G06F 2221/033; H04L 63/1425; H04L 63/1441
USPC .......................................................... 726/23
See application file for complete search history.

(56) References Cited

U.S. PATENT DOCUMENTS

| | | | | |
|---|---|---|---|---|
| 6,976,163 B1* | 12/2005 | Hind | ..................... | G06F 21/335 |
| | | | | 713/1 |
| 10,346,614 B1* | 7/2019 | Ko | ......................... | H04L 9/3247 |
| 2012/0204166 A1* | 8/2012 | Ichihara | ........... | G08G 1/096716 |
| | | | | 717/168 |
| 2012/0209654 A1* | 8/2012 | Romagnino | ........... | G16H 40/20 |
| | | | | 705/7.27 |
| 2014/0109075 A1* | 4/2014 | Hoffman | ............. | G06F 11/1464 |
| | | | | 717/169 |

(Continued)

FOREIGN PATENT DOCUMENTS

| | | | | | |
|---|---|---|---|---|---|
| CN | 109491756 A | * | 3/2019 | | |
| JP | 4787333 B2 | * | 10/2011 | ............. | G06Q 30/02 |

(Continued)

OTHER PUBLICATIONS

Office Action from Japan Patent Office (JPO) in Japanese Patent Appl. No. 2022-081617, dated Nov. 4, 2025, together with an English language translation.

(Continued)

*Primary Examiner* — Liang Che A Wang
(74) *Attorney, Agent, or Firm* — Greenblum & Bernstein, P.L.C.

(57) ABSTRACT

In a security method according to one aspect of the present disclosure, when a fraudulent command is detected in an in-vehicle communication network, an electronic control unit (ECU) which can transmit a fraudulent command is specified, the specified ECU is caused to execute update of the software used by the specified ECU, and execution of update of the software by the specified ECU is prohibited after the update of the software is executed.

16 Claims, 5 Drawing Sheets

(56)     References Cited

U.S. PATENT DOCUMENTS

| | | | |
|---|---|---|---|
| 2015/0007155 A1* | 1/2015 | Hoffman .................. | G06F 8/65 |
| | | | 717/168 |
| 2019/0265966 A1 | 8/2019 | Shimomura | |
| 2019/0334897 A1 | 10/2019 | Anzai et al. | |
| 2020/0174778 A1* | 6/2020 | David ..................... | H04W 4/80 |
| 2020/0186552 A1* | 6/2020 | Maeda ................... | H04L 12/28 |
| 2020/0274851 A1* | 8/2020 | Qiao .................. | H04L 63/0263 |
| 2022/0019669 A1 | 1/2022 | Morita et al. | |

FOREIGN PATENT DOCUMENTS

| | | |
|---|---|---|
| JP | 2017-041167 | 2/2017 |
| JP | 2018-072920 | 5/2018 |
| JP | 2018-117254 | 7/2018 |
| JP | 2019-075056 | 5/2019 |
| JP | 2020-107237 | 7/2020 |

OTHER PUBLICATIONS

Office Action from Japan Patent Office (JPO) in Japanese Patent Appl. No. 2022-081617, dated Feb. 17, 2026, together with an English language translation.

* cited by examiner

SECURITY METHOD AND SECURITY DEVICE

CROSS REFERENCE TO RELATED APPLICATION

The present application is based on and claims priority of Japanese Patent Application No. 2022-081617 filed on May 18, 2022.

FIELD

The present disclosure relates to a security method and a security device.

BACKGROUND

In the related art, there are systems which provide security in communication networks such as in-vehicle communication networks.

Patent Literature (PTL) 1 discloses a device which restrains controls of a vehicle according to influences on the controls of the vehicle when an attack against the vehicle is detected.

CITATION LIST

Patent Literature

PTL 1: Japanese Unexamined Patent Application Publication No. 2019-75056

SUMMARY

However, the device disclosed in PTL 1 can be improved upon.

In view of this, the present disclosure provides a security method and so on which is capable of improving upon the above related art.

The security method according to one aspect of the present disclosure specifies an electronic control unit (ECU) which can transmit a fraudulent command when the fraudulent command is detected in an in-vehicle communication network; causes the ECU specified to execute update of a software used by the ECU specified; and prohibits the ECU specified from executing update of the software after the update of the software by the ECU specified is executed.

These general and specific aspects may be implemented with a system, a method, an integrated circuit, a computer program, or a non-transitory recording medium such as a computer-readable CD-ROM, or may be implemented with any combination of a system, a method, an integrated circuit, a computer program, and a non-transitory recording medium.

The security method according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
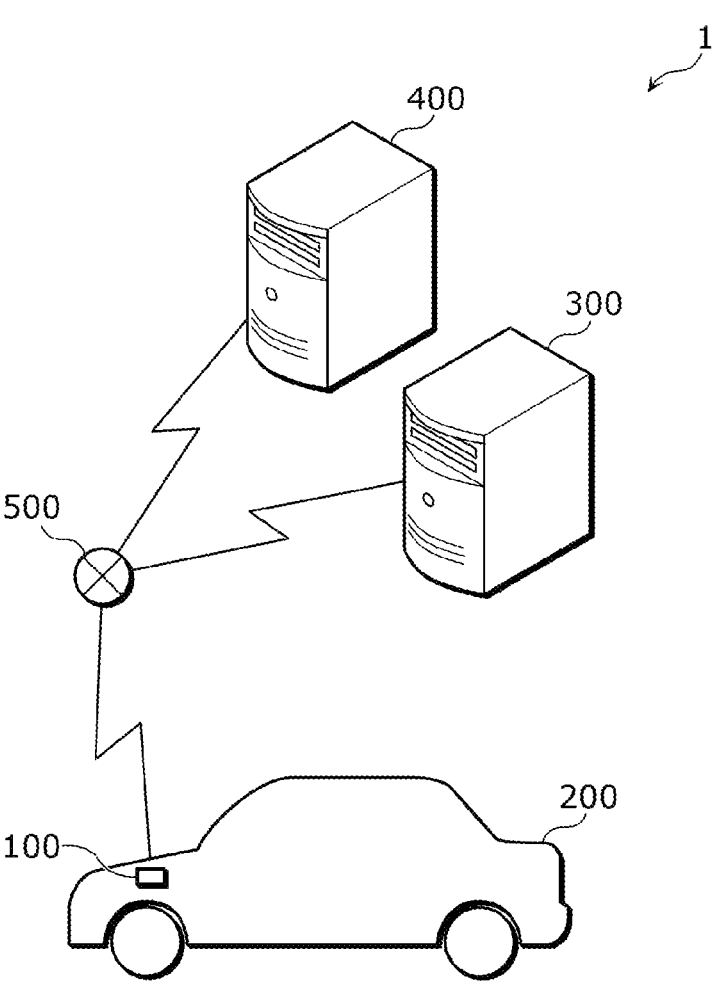
FIG. 1 is a schematic view of the security system according to an embodiment.

DESCRIPTION OF EMBODIMENT (Underlying Knowledge Forming Basis of the Present Disclosure)

When an attack (specifically, cyberattack) is detected in an in-vehicle network of a vehicle, to ensure safety of a passenger of the vehicle such as a driver, an instant response as an emergency measure is needed for the purpose of preventing anomaly operation of the vehicle caused by the attack. Examples of the instant response include degeneration, vehicle control restraining, or shut-down of external communication.

The degeneration is an operation to perform emergency stop of the vehicle in a safe place such as a road shoulder by automatic control. The vehicle control restraining is a processing to restrain the control of an actuator (such as a wheel, a brake, and an accelerator) to suppress influences of anomaly operation caused by the attack. The shut-down of external communication is a processing to shut down communication between the vehicle to an external apparatus outside the vehicle through Wi-Fi (registered trademark) or mobile communication, assuming some remote fraudulent attack against the control of the vehicle from the outside of the vehicle.

However, for example, the degeneration does not block the attack itself. Thus, a similar attack may be received again when the driving is restarted. For this reason, it is afraid that the vehicle after emergency stop cannot move.

For example, the vehicle control restraining also restrains normal driving controls, and thus, it is afraid that the driver also cannot normally drive.

For example, in the shut-down of external communication, it is afraid that autonomous driving functions which need external communication cannot be used. In this case, a similar attack may be received again when the external communication is restarted.

In such instant responses, the attack can be avoided as an emergency measure while use of the vehicle may be impossible until a permanent measure such as analysis of vulnerability or creation of a security patch is developed. This causes troubles, for example, driving of the attacked vehicle is disabled or part of the functions cannot be used, and the vehicle should be repaired or the like in a service center using another vehicle for carrying the vehicle.

Thus, the present inventors have found a security method and the like which can quickly respond to an attack against the vehicle, even when attacked, without restricting the driving functions of the vehicle after the attack is detected.

The security method according to one aspect of the present disclosure specifies an electronic control unit (ECU) which can transmit a fraudulent command when the fraudulent command is detected in an in-vehicle communication network; causes the ECU specified to execute update of a software used by the ECU specified; and prohibits the ECU specified from executing update of the software after the update of the software by the ECU specified is executed.

The attack for which an instant response is required, for example, is an attack which leads to an anomaly operation of the vehicle by inserting a fraudulent controller area network (CAN) control command. The attack by insertion of a fraudulent CAN control command is performed by fraudulently rewriting software used by an electronic control unit (ECU), the software enabling transmission of the CAN control command. For example, the software is rewritten by a remote instruction from the outside of the vehicle to transmit a fraudulent CAN control command. For example, an unauthorized connection (intrusion) is made to an entry point, the software is fraudulently rewritten (i.e., taken over), and a fraudulent CAN control command is transmitted (i.e., an attack is executed). Then, when the fraudulent CAN control command is detected, the ECU which transmits the fraudulent CAN control command is specified, and the ECU is forced to execute update (updating) of the software. Thereby, the software is updated to a state before fraudulent rewriting, for example. Furthermore, for example, the update function of the ECU in which the software is updated is temporarily invalidated until a permanent measure is completed (specifically, distribution of patch software against vulnerability is prepared). In other words, the software rewrite command is invalidated. For this reason, even when an attack with a fraudulent CAN control command is received, an instant response can be performed without restraining the driving functions. In other words, the security method according to one aspect of the present disclosure can take a measure against an attack against the vehicle, even if received, without restraining the driving functions of the vehicle. Thereby, for example, the driver can drive the attacked vehicle to evacuate to home, or can drive the attacked vehicle to a service center for recovery from troubles.

Moreover, for example, information used in update of the software is stored in a storage included in a vehicle where the ECU specified is included.

Thereby, update of the software can be executed without communicating with a server located outside the vehicle.

Moreover, for example, the processing to execute update of the software includes causing the ECU specified to execute rollback of the software.

Thereby, the software can be immediately updated (changed) to a state before attacked without preparing update software such as a security patch against fraudulent commands.

Moreover, for example, when, after the ECU specified is prohibited from executing update of the software, information indicating that a measure has been developed against the fraudulent command is obtained, the ECU specified is enabled to execute update of the software.

Thereby, when a measure against similar attacks to the attack which causes transmission of the fraudulent command is completed, for example, when a security patch where a measure is developed against the fraudulent command is created, update of the software can be executed as needed.

Moreover, the security device according to one aspect of the present disclosure includes a security device including a specifier which specifies an electronic control unit (ECU) which can transmit a fraudulent command when the fraudulent command is detected in an in-vehicle communication network; an update instructor which causes the ECU specified to execute update of software used by the ECU specified; and an update prohibition instructor which prohibits the ECU specified from executing update of the software after the update of the software by the ECU specified is executed.

Thereby, the same effects as those of the security method according to one aspect according to the present disclosure are obtained.

These general and specific aspects may be implemented with a system, a method, an integrated circuit, a computer program, or a non-transitory recording medium such as a computer-readable CD-ROM, or may be implemented with any combination of a system, a method, an integrated circuit, a computer program, and a non-transitory recording medium.

Hereinafter, an embodiment according to the present disclosure will be specifically described with reference to the drawings.

To be noted, embodiments described below all illustrate one specific examples of the present disclosure. Numeric values, shapes, materials, components, arrangement positions of components, connection forms thereof, steps, order of steps, and the like shown in the embodiments below are exemplary, and should not be construed as limitations to the present disclosure. Moreover, among the components of the embodiments below, the components not described in an independent claim will be described as optional components.

Embodiment 1

[Configuration]

FIG. 1 is a schematic view of security system 1 which provides information to a vehicle according to an embodiment.

Security system 1 is an in-vehicle communication network system including security device 100, vehicle 200, monitoring server 300, and OTA server 400 communicably connected to each other through network 500 such as the Internet.

Security device 100 is a device for monitoring the state of vehicle 200. Security device 100 is communicably connected to monitoring server 300.

Security device 100 obtains information (also referred to as detection information) regarding an attack (specifically, cyberattack) against vehicle 200 detected by vehicle 200, and monitors the state of vehicle 200 based on the obtained detection information. Specifically, security device 100 switches enabling/invalidation of update of software used each of ECUs 220 (see FIG. 2) included in vehicle 200, based on the obtained detection information.

For example, security device 100 is a computer implemented with a telematics control unit (TCU) including a cellular module supporting standards of a moving body communication network for communicating with monitoring server 300, a communication interface for communicating with anomaly detector 210 and software updater 230, a non-volatile memory storing programs, a volatile memory as a temporary storage region for executing programs, input/output ports for transmitting and receiving signals, and a processor which executes programs.

The communication interface included in security device 100 may be a wired local area network (LAN) interface, or may be a wireless LAN interface. The communication interface included in security device 100 is not limited to the LAN interface, and can be any communication interface as long as it can establish connection of communication with the communication network.

Alternatively, security device 100 may be implemented with the TCU and the ECU included in vehicle 200 by imparting the function of security device 100 to the TCU and the ECU in addition to the original functions thereof.

Vehicle 200 includes security device 100, and receives detection information. Vehicle 200 is any vehicle such as a two- or four-wheeler. In the present embodiment, vehicle 200 is an autonomous vehicle having autonomous driving functions.

For example, vehicle 200 includes a TCU and ECUs 220 as the hardware configuration, and each of ECUs 220 is a computer implemented with a non-volatile memory storing programs, a volatile memory as a temporary storage region for executing programs, input/output ports for transmitting and receiving CAN control command signals to and from the TCU and other ECUs, and a processor which executes programs. ECUs 220 are connected to an in-vehicle communication network such as a CAN by the input/output ports to be communicable through the in-vehicle communication network.

Vehicle 200 need not be an autonomous vehicle.

Monitoring server 300 is a computer for communicating with security device 100 and monitoring the state of vehicle 200. For example, monitoring server 300 is a server used in a monitoring center such as a security operation center (SOC). Monitoring server 300 is communicably connected to security device 100. Monitoring server 300 is implemented with a communication interface for communicating with security device 100, a non-volatile memory storing programs, a volatile memory as a temporary storage region for executing programs, input/output ports for transmitting and receiving signals, and a processor which executes programs.

OTA server 400 is an over-the-air (OTA) server which stores software used by each of ECUs 220 included in vehicle 200. OTA server 400 is communicably connected to vehicle 200 (specifically, software updater 230 included in vehicle 200 (see FIG. 2)).

For example, OTA server 400 is implemented with a communication interface for communicating with vehicle 200, a non-volatile memory storing programs, a volatile memory as a temporary storage region for executing programs, input/output ports for transmitting and receiving signals, and a processor which executes programs.

Figure 2:
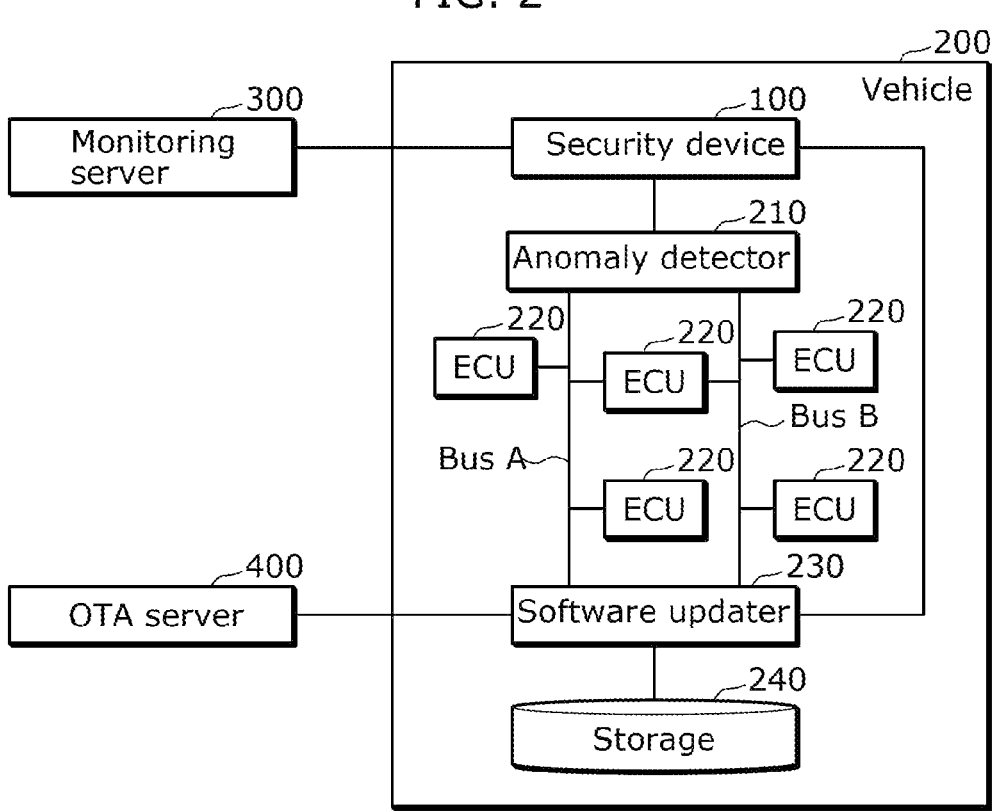
FIG. 2 is a block diagram illustrating the configuration of the vehicle according to the embodiment.

FIG. 2 is a block diagram illustrating the configuration of vehicle 200 according to the embodiment. In FIG. 2, network 500 is not illustrated.

Vehicle 200 includes anomaly detector 210, ECUs 220, software updater 230, and storage 240. In the present embodiment, vehicle 200 includes security device 100.

For example, anomaly detector 210 is a network-based intrusion detection system (NIDS), and is a processor which is communicably connected to each of ECUs 220 via a bus (bus A or bus B in the present embodiment), and monitors data flowing through the connected bus. Specifically, anomaly detector 210 detects an attack against vehicle 200 (more specifically, ECU 220) by monitoring data flowing through the bus connected to ECU 220. Anomaly detector 210 is communicably connected to security device 100, and transmits detection information indicating the result of detection of the attack (anomaly detection log) to security device 100.

For example, anomaly detector 210 is implemented with an ECU.

ECUs 220 each are included in vehicle 200, and are communicable through an in-vehicle communication network (more specifically, the bus connected to each ECU). ECUs 220 execute control of apparatuses included in vehicle 200, for example. Examples of the apparatuses include an engine, a motor, a meter, a transmission, a brake, a steering wheel, a power window, and an air conditioner. At least one of ECUs 220 is, for example, a control circuit which controls the vehicle operation according to the autonomous driving of vehicle 200. For example, ECUs 220 are disposed corresponding to these various apparatuses. ECUs 220 each include a storage (non-volatile storage region) (not illustrated) which stores a program (software) executed by each ECU 220. For example, the storage is a non-volatile memory.

ECUs 220 transmit commands for controlling the corresponding apparatuses. The command is a command in conformity with a communication protocol of a controller area network (CAN) or the like (also referred to as CAN control command), for example.

By monitoring the command flowing through the bus, anomaly detector 210 determines whether ECUs 220 are attacked, more specifically, whether the software used by each of ECUs 220 is unwantedly modified.

The number of ECUs 220 and the number of buses connected to ECUs 220 are not particularly limited.

Software updater 230 is a processor which executes update of software used by each of ECUs 220. Specifically, for example, software updater 230 is communicably connected with OTA server 400, obtains the latest software from OTA server 400, and causes the obtained software to execute update of the software used by each of ECUs 220. For example, software updater 230 causes the obtained latest software (that is, a backup of the software already installed and update software used in rollback described later) to be stored in storage 240.

For example, software updater 230 is implemented with a TCU and an ECU.

Storage 240 is a memory device which is included in vehicle 200 and stores the software used by each of ECUs 220. For example, storage 240 is implemented with a hard disk drive (HDD) or a solid state drive (SSD). Moreover, for example, storage 240 stores information used in update of the software. For example, as the information used in update of the software, storage 240 may store update software (that is, rollback software used by rollback) used in rollback described later or update software such as any software used in update.

Storage 240 may include a read only memory (ROM) and/or a random access memory (RAM) which is unrewritable unless the legitimacy is verified by authentication. The update software such as rollback software may be stored in the ROM and/or the RAM.

Thereby, fraudulent rewriting of the update software can be suppressed.

Figure 3:
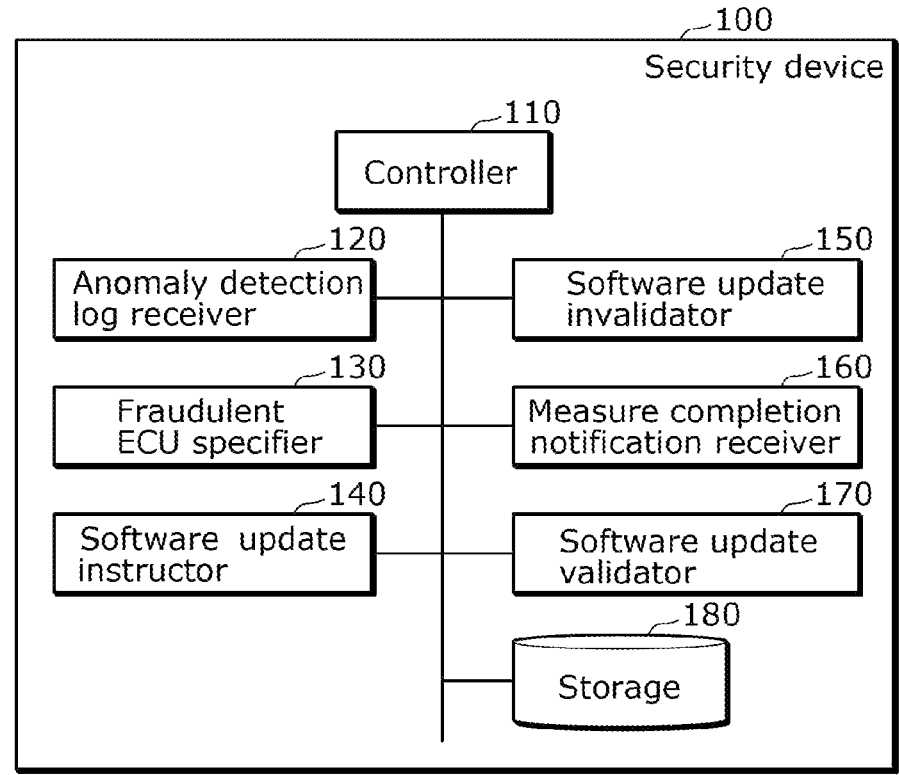
FIG. 3 is a block diagram illustrating the configuration of the security device according to the embodiment.

FIG. 3 is a block diagram illustrating the configuration of security device 100 according to the embodiment.

Security device 100 includes controller 110, anomaly detection log receiver 120, fraudulent ECU specifier 130, software update instructor 140, software update invalidator 150, measure completion notification receiver 160, software update validator 170, and storage 180.

Controller 110 is a processor which controls devices included in security device 100. For example, controller 110 controls anomaly detection log receiver 120, fraudulent ECU specifier 130, software update instructor 140, software update invalidator 150, measure completion notification receiver 160, and software update validator 170, and causes them to execute the processings.

Anomaly detection log receiver 120 receives information (also referred to as anomaly detection log) from anomaly detector 210, the information indicating that an anomaly command (hereinafter, also referred to as fraudulent CAN control command) is flowing through the bus in the in-vehicle communication network. The fraudulent CAN control command is one example of the fraudulent command. The anomaly detection log contains the content of the fraudulent command detected, and information indicating the bus through which the fraudulent CAN control command flows among the buses forming the in-vehicle communication network, for example. When anomaly detector 210 can specify ECU 220 which transmits the fraudulent CAN control command, the anomaly detection log may contain information indicating ECU 220 which transmits the fraudulent CAN control command.

Fraudulent ECU specifier 130 is a processor which specifies ECU 220 which can transmit a fraudulent CAN control command when the fraudulent CAN control command is detected in the in-vehicle communication network. For example, fraudulent ECU specifier 130 specifies ECU 220 which can transmit the fraudulent CAN control command, based on the anomaly detection log received by anomaly detection log receiver 120.

ECU 220 which can transmit the fraudulent CAN control command is, for example, ECU 220 connected to the bus through which the fraudulent CAN control command flows. For example, when anomaly detector 210 detects the fraudulent CAN control command flowing through bus A among bus A and bus B illustrated in FIG. 2, among five ECUs 220 connected to at least one of bus A or bus B, fraudulent ECU specifier 130 may specify three ECUs 220 connected to bus A, as ECUs 220 which can transmit the fraudulent CAN control command.

In some cases, it is configured at a hardware level such that each ECU can transmit only specific commands depending on the content of the command (e.g., Tx filtering). In such a case, for example, fraudulent ECU specifier 130 specifies ECU 220 which can transmit the fraudulent CAN control command, based on the content of the fraudulent CAN control command. Information regarding the commands which can be transmitted by each ECU 220 may be preliminarily stored in storage 180, for example.

The number of ECUs 220 specified by fraudulent ECU specifier 130 is not particularly limited.

Software update instructor 140 causes ECU 220 specified by fraudulent ECU specifier 130 to execute update of the software used by ECU 220 specified. Specifically, software update instructor 140 transmits an instruction to execute update of the software used by ECU 220 specified by fraudulent ECU specifier 130 (specifically, information indicating an instruction) to software updater 230. For example, when software updater 230 receives the instruction from software update instructor 140, software updater 230 causes ECU 220 specified to execute update of the software used by ECU 220 specified, according to the instruction. For example, in the processing to execute update of the software, software update instructor 140 transmits an instruction to cause ECU 220 specified by fraudulent ECU specifier 130 to execute rollback of the software, to software updater 230. Moreover, for example, when software updater 230 receives the instruction from software update instructor 140, using the update software obtained from OTA server 400 or storage 240, software updater 230 causes ECU 220 specified to execute update of the software used by ECU 220 specified. For example, when software updater 230 obtains the instruction to cause ECU 220 specified to execute update of the software, software updater 230 causes ECU 220 specified to execute update of the software used, for example, to change the software used to the update software or to rollback the software.

After software update instructor 140 instructs and causes ECU 220 specified by fraudulent ECU specifier 130 to execute update of the software used by ECU 220, software update invalidator 150 prohibits execution of update of the software by ECU 220 specified. Specifically, software update invalidator 150 is a processor which transmits an instruction to prohibit execution of update of the software used by ECU 220 specified by fraudulent ECU specifier 130, that is, an instruction to invalidate update of the software, to software updater 230. When software updater 230 receives the instruction to invalidate update of the software, software updater 230 transmits the instruction to invalidate update of the software used to ECU 220 specified. When ECU 220 specified obtains the instruction to invalidate update of the software used, it does not execute update of the software until it obtains an instruction to enable update of the software even if it obtains a command to instruct update of the software.

For example, such an instruction to invalidate update of the software is executed after software updater 230 and ECU 220 verify using a predetermined authentication method whether it is a correct instruction. In the predetermined authentication method, for example, according to an authentication key exchange (AKE) protocol using a private-key cipher or a public-key cipher, software updater 230 or ECU 220 authenticates software update invalidator 150 or software updater 230 which transmits the instruction to invalidate update of the software, and shares a temporary key. Using the shared temporary key, authenticated software update invalidator 150 or software updater 230 then encrypts a command to instruct invalidation of software update, and transmits the command to software updater 230 or ECU 220. When receiving the command, software updater 230 or ECU 220 decrypts the encrypted command, and invalidates software update only when a correct command is decrypted.

The above method is one example of the authentication method, and the predetermined authentication method is not limited to this method. For example, based on whether an invalidation instruction is an instruction transmitted from security device 100, it may be determined whether the instruction is a correct instruction.

Measure completion notification receiver 160 is a processor which receives information from monitoring server 300, the information indicating that a measure not to transmit a fraudulent CAN control command is developed for the software used by ECU 220 specified by fraudulent ECU specifier 130.

Software update validator 170 is a processor which transmits an instruction to permit update of the software used by ECU 220 specified by fraudulent ECU specifier 130, that is, an instruction to enable update of the software to software updater 230.

For example, when the information indicating that a measure has been developed against a fraudulent CAN control command is obtained, software update validator 170 transmits an instruction to enable execution of update of the software by ECU 220 specified, to software updater 230. When software updater 230 obtains the instruction to enable update of the software, software updater 230 transmits an instruction to enable update of the software used, to ECU 220 specified. When ECU 220 specified obtains the instruction to enable update of the software used, for example, when ECU 220 obtains a command to instruct update of the software, ECU 220 specified changes the processing to execute update of the software.

For example, such an instruction to enable update of the software is executed after using a predetermined authentication method, software updater 230 and ECU 220 verify whether it is a correct instruction.

The predetermined authentication method is not particularly limited. For example, the predetermined authentication method may be a method based on the above-mentioned authentication key exchange (AKE) protocol using a private-key cipher or a public-key cipher, or it may be determined whether the validation instruction is a correct instruction, based on whether the instruction is transmitted from security device 100.

The authentication method for the validation instruction and that for the invalidation instruction may be the same or different.

The information indicating that a measure has been developed against a fraudulent CAN control command may be information indicating that the update software in which a measure is developed against the fraudulent CAN control command (also referred to as update software in which a measure is developed, or a security patch) is created after software update invalidator 150 prohibits execution of update of the software by ECU 220 specified by fraudulent ECU specifier 130, or may be the update software itself in which a measure is developed, and is not particularly limited.

When software updater 230 obtains the update software in which a measure is developed against the fraudulent CAN control command (also referred to as update software in which a measure is developed or a security patch) from OTA server 400 or the like, for example, software updater 230 transmits an instruction to ECU 220 specified, the instruction being that to execute update of the software used by ECU 220 specified, using the update software in which a measure is developed.

Whether software updater 230 obtains the update software in which a measure is developed against the fraudulent CAN control command from OTA server 400 or the like may be determined, for example, based on whether measure completion notification receiver 160 receives information indicating that the measure against transmission of the fraudulent CAN control command is completed (also referred to as measure completion notification) from monitoring server 300 or the like. For example, when controller 110 receives the measure completion notification through measure completion notification receiver 160 from monitoring server 300, controller 110 may determine that software updater 230 obtains the update software for the fraudulent CAN control command from OTA server 400 or the like, and may cause software updater 230 to transmit to software update validator 170 an instruction to enable execution of update of the software by ECU 220 specified. Furthermore, in this case, controller 110 may cause software updater 230 to transmit to software update instructor 140 an instruction to execute update of the software by ECU 220 specified, using the update software in which a measure is developed.

The processors such as controller 110 and fraudulent ECU specifier 130 and the processors included in anomaly detection log receiver 120, software update instructor 140, software update invalidator 150, measure completion notification receiver 160, and software update validator 170 are implemented with a processor and a memory which stores control programs executed by the processor. Moreover, anomaly detection log receiver 120, software update instructor 140, software update invalidator 150, measure completion notification receiver 160, and software update validator 170 each include a communicator for transmitting and receiving information, such as a communication interface. The communicators included in anomaly detection log receiver 120, software update instructor 140, software update invalidator 150, measure completion notification receiver 160, and software update validator 170 may be implemented with the same communication interface, or may be implemented with different communication interfaces.

Storage 180 is a memory device which stores pieces of information received from anomaly detector 210 and monitoring server 300. Storage 180 is implemented with an HDD or an SSD. Storage 180 may store information used in update of the software used by ECU 220 specified by fraudulent ECU specifier 130 (such as update software). For example, software update instructor 140 may transmit the update software stored in storage 180 to software updater 230 in addition to the instruction to execute update of the software. Software updater 230 may cause ECU 220 specified to execute update of the software using the update software obtained from security device 100.

Storage 180 may include an ROM and/or a RAM which is unrewritable unless the legitimacy is verified by authentication. The update software such as the rollback software may be stored in an ROM and/or an RAM.

Thereby, fraudulent rewriting of the update software can be suppressed.

[Processing Procedure]

Subsequently, the processing procedures of security system 1 and security device 100 will be described.

Figure 4:
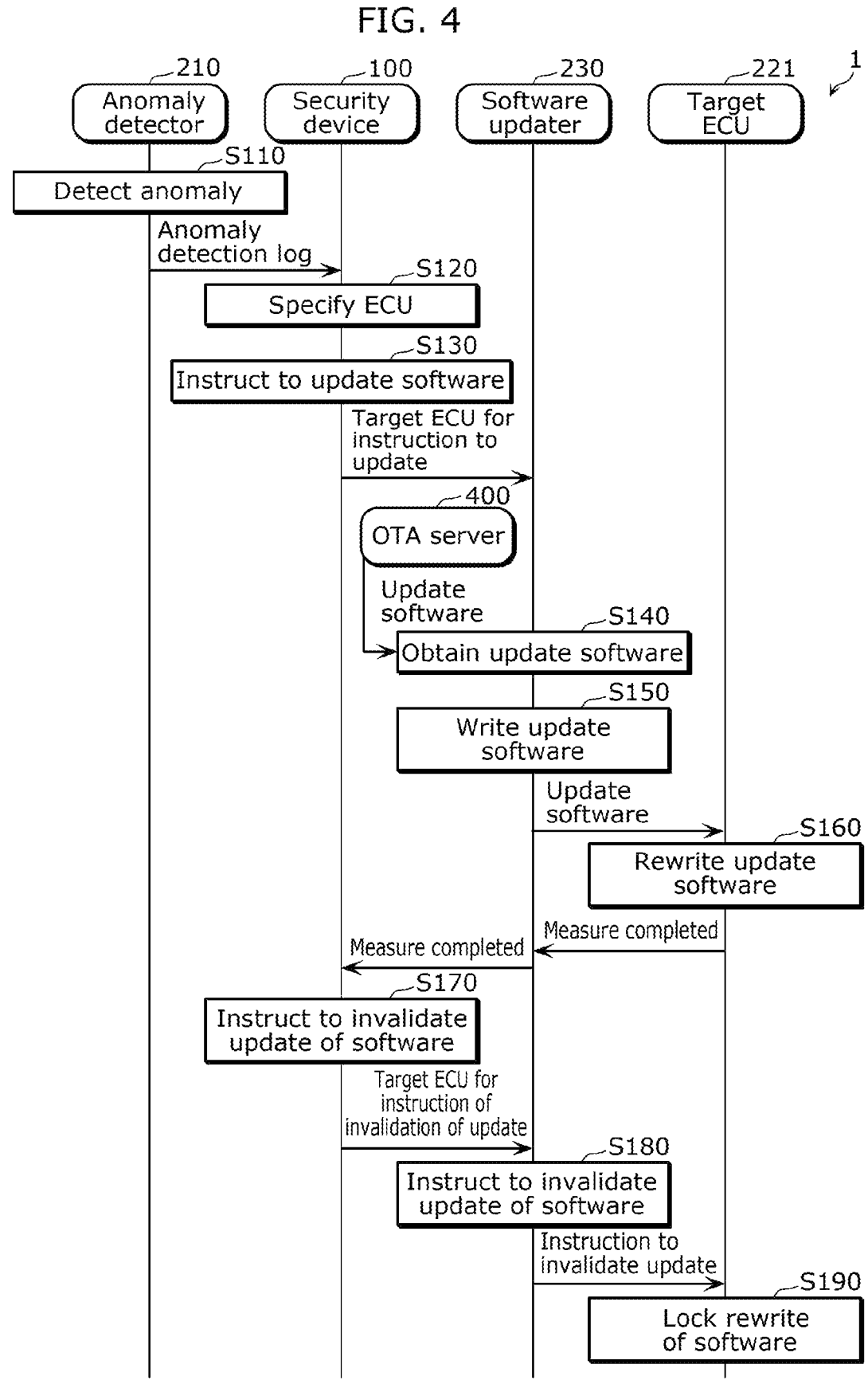
FIG. 4 is a sequence diagram illustrating the processing procedure to invalidate the update of software in the security system according to the embodiment.

FIG. 4 is a sequence diagram illustrating a processing procedure to invalidate update of the software in security system 1 according to the embodiment. Target ECU 221 illustrated in FIG. 4 is ECU 220 which is one of ECUs 220 included in vehicle 200 and specified by security device 100 that it can transmit the fraudulent CAN control command. FIG. 4 illustrates one target ECU 221, although a plurality of ECUs 221 may be included.

First, anomaly detector 210 monitors commands in the in-vehicle communication network of vehicle 200. When anomaly detector 210 detects an anomaly, that is, detects a fraudulent CAN control command flowing in the in-vehicle communication network (S110), anomaly detector 210 transmits an anomaly detection log to security device 100.

Next, based on the anomaly detection log, security device 100 specifies target ECU 221, which is ECU 220 which can transmit the fraudulent CAN control command among ECUs 220 included in vehicle 200 (S120).

Next, security device 100 transmits an instruction to execute update of the software used by target ECU 221 (instruction to update) to software updater 230 in addition to information indicating target ECU 221 (such as the identifier of target ECU 221, where an identifier is uniquely determined for each ECU 220) (S130).

Next, software updater 230 obtains the update software from OTA server 400 or the like (S140). Software updater 230 may obtain the update software from storage 240 or security device 100.

Next, software updater 230 performs writing processing to rewrite the software used by target ECU 221 on the obtained update software (S150). For example, by transmitting the obtained update software to target ECU 221, software updater 230 causes target ECU 221 to rewrite the software used by target ECU 221 with the update software, i.e., to update the software.

Next, target ECU 221 rewrites the software used (S160). That is, target ECU 221 executes update of the software using the update software. Furthermore, for example, target ECU 221 transmits information to software updater 230, the information indicating that rewrite of the software is completed. Moreover, for example, software updater 230 transmits information to security device 100, for example, the information indicating that rewrite of the software by target ECU 221 is completed.

Next, security device 100 transmits an instruction to invalidate update of the software used by target ECU 221 (instruction to invalidate update) to software updater 230 in addition to the information indicating target ECU 221 (S170).

Next, software updater 230 performs processing to invalidate update of the software used by target ECU 221. For example, by transmitting an instruction to invalidate update of the software (instruction to invalidate update) to target ECU 221, software updater 230 causes target ECU 221 to invalidate update of the software used by target ECU 221 (S180).

Next, target ECU 221 invalidates update of the software, that is, locks rewrite of the software (S190). This prevents update of the software used by target ECU 221.

Figure 5:
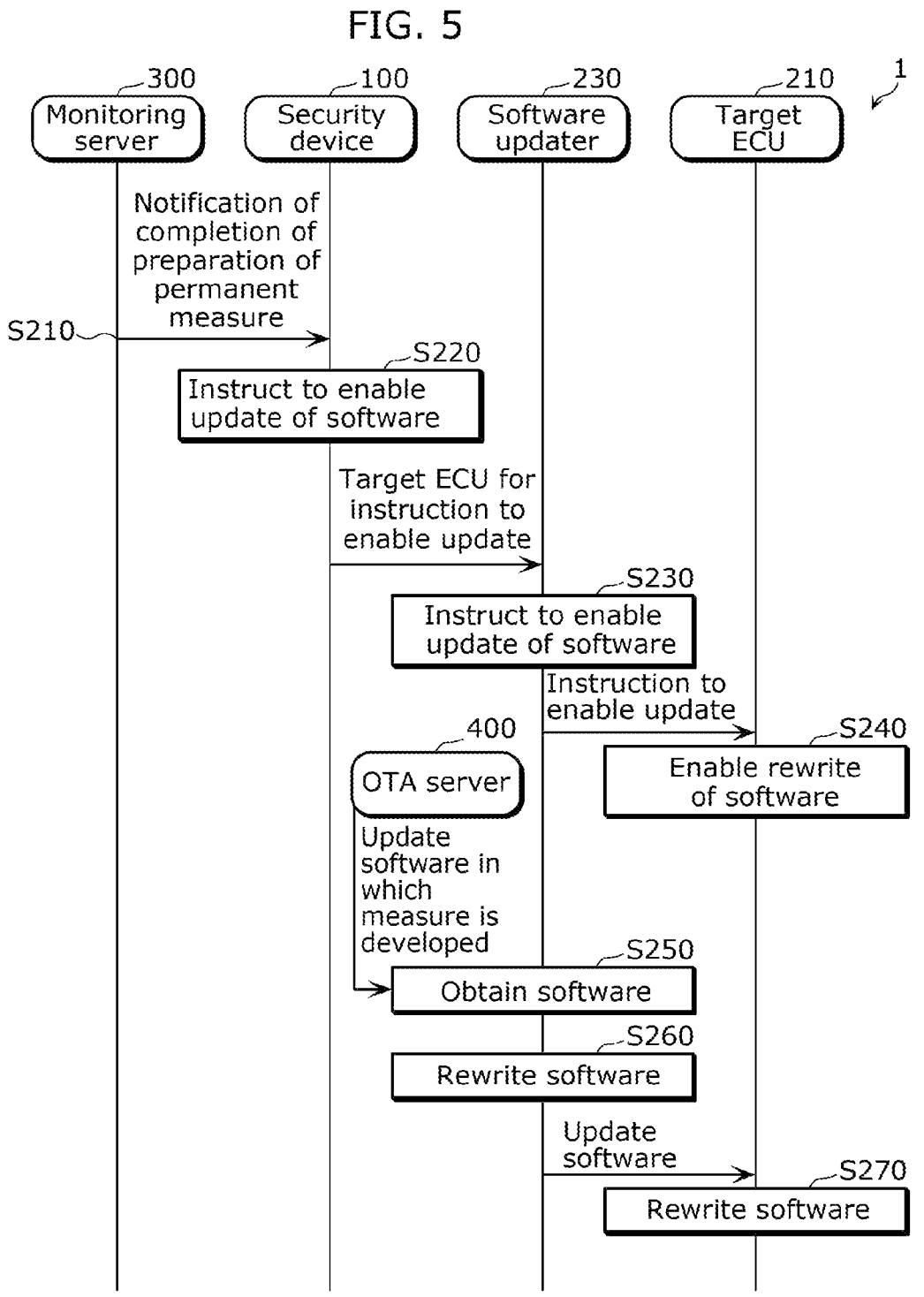
FIG. 5 is a sequence diagram illustrating the processing procedure to enable the update of software in the security system according to the embodiment.

FIG. 5 is a sequence diagram illustrating a processing procedure to enable update of the software in security system 1 according to the embodiment. FIG. 5 is processing executed after the processing in FIG. 4 is executed, for example.

Assume that preparation of a measure against the anomaly is completed, for example, the update software in which a measure is developed against the anomaly (fraudulent CAN control command) detected in step S110 illustrated in FIG. 4 is created. Monitoring server 300 transmits information indicating that preparation of a measure against the anomaly is completed (notification of completion of preparation of a permanent measure) to security device 100 (S210).

Next, security device 100 transmits an instruction to enable update of the software used by target ECU 221 (instruction to enable update) to software updater 230 in addition to the information indicating target ECU 221 (such as the identifier of target ECU 221) (S220).

Next, software updater 230 performs processing to enable update of the software used by target ECU 221. For example, by transmitting an instruction to enable update of the software (instruction to enable update) to target ECU 221, software updater 230 causes target ECU 221 to enable update of the software used by target ECU 221 (S230).

Next, target ECU 221 enables update of the software used, i.e., enables rewrite by unlocking the rewrite lock (S240). This enables execution of update of the software by target ECU 221. At this time, for example, target ECU 221 may transmit information to software updater 230, the information indicating that update of the software is enabled.

Next, software updater 230 obtains the update software in which a measure is developed against the fraudulent CAN control command from OTA server 400 (S250).

Next, software updater 230 performs processing to rewrite the software used by target ECU 221 on the obtained update software in which a measure is developed (S260). For example, by transmitting the obtained update software in which a measure is developed to target ECU 221, software updater 230 causes target ECU 221 to rewrite the software used by target ECU 221 with the update software in which a measure is developed.

Next, target ECU 221 rewrites the software used (S270). That is, target ECU 221 executes update of the software using the update software in which a measure is developed. For example, target ECU 221 transmits information to software updater 230, the information indicating that rewrite of the software is completed. Moreover, for example, software updater 230 transmits the information to security device 100, the information indicating that target ECU 221 completes rewrite of the software.

Figure 6:
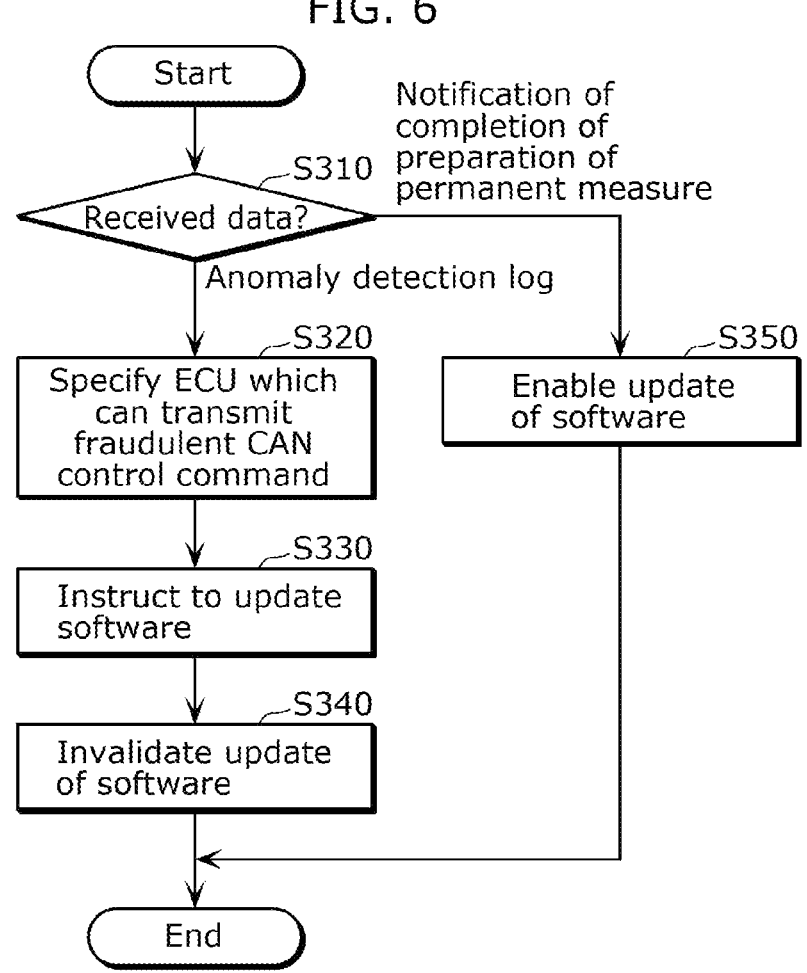
FIG. 6 is a flowchart illustrating the processing procedure of the security device according to the embodiment.

FIG. 6 is a flowchart illustrating a processing procedure of security device 100 according to the embodiment.

Controller 110 checks information (received data) received through anomaly detection log receiver 120 or measure completion notification receiver 160 from anomaly detector 210 or monitoring server 300 (S310).

When the received data is an anomaly detection log ("Anomaly detection log" in S310), the processing illustrated in the sequence diagram of FIG. 4 is performed. Specifically, when fraudulent ECU specifier 130 receives an anomaly detection log through anomaly detection log receiver 120, it specifies ECU 220 which can transmit the fraudulent CAN control command (i.e., target ECU 221) (S320).

Next, software update instructor 140 instructs update of the software used by ECU 220 specified (S330). Specifically, software update instructor 140 causes ECU 220 specified to execute update of the software used by ECU 220 specified.

Next, software update invalidator 150 invalidates update of the software used by ECU 220 specified (S340). Specifically, software update invalidator 150 causes ECU 220 specified to execute update of the software, and thereafter prohibits ECU 220 specified from executing update of the software.

In contrast, when the received data is a notification of completion of preparation of a permanent measure ("Notification of completion of preparation of permanent measure" in S310), the processing illustrated in the sequence diagram of FIG. 5 is performed. Specifically, when a notification of completion of preparation of a permanent measure is received through anomaly detection log receiver 120, software update validator 170 enables update of the software used by ECU 220 specified (S350). Specifically, software update validator 170 enables execution of update of the software by ECU 220 specified. Thereby, for example, in steps S250 to S270 illustrated in FIG. 5, ECU 220 specified performs the processing using the update software.

SUMMARY

As described above, in the security method according to the embodiment, when a fraudulent CAN control command is detected in an in-vehicle communication network ("Anomaly detection log" in S310), ECU 220 which can transmit the fraudulent CAN control command is specified (S320), ECU 220 specified is caused to execute update of the software used by ECU 220 specified (S330), and execution of update of the software by ECU 220 specified is prohibited after update of the software is executed (S340).

Thereby, an instant response can be performed without restraining the driving functions even when an attack is received by transmitting the fraudulent CAN control command due to fraudulent rewriting of the software used by the ECU. For this reason, even when vehicle 200 is attacked, a measure can be taken against the attack without restraining the driving functions of vehicle 200. Thereby, for example, the driver can drive attacked vehicle 200 to evacuate to home, or can drive vehicle 200 to a service center for recovery from troubles.

Moreover, for example, information used in update of the software is stored in a storage included in vehicle 200 where ECU 220 specified is included. The storage may be storage 240, or may be storage 180, for example. When the information used in update of the software is stored in storage 180, software updater 230 may obtain the information from security device 100.

Thereby, update of the software can be executed without communicating with OTA server 400 or the like located outside vehicle 200.

Moreover, for example, processing to cause ECU 220 to execute update of the software (S330) includes causing ECU 220 specified to execute rollback of the software.

Thereby, the software can be immediately updated (changed) to a state not attacked without preparing update software such as a security patch against the fraudulent CAN control command.

Moreover, for example, when, after ECU 220 specified is prohibited from executing update of the software by ECU 220 specified (after S340), the information indicating that a measure has been developed against a fraudulent CAN control command is obtained ("Notification of completion of preparation of permanent measure" in S310), ECU 220 specified is caused to enable execution of update of the software by ECU 220 (S350).

Thereby, when a measure against similar attacks to the attack that causes transmission of the fraudulent CAN control command is completed, for example, when a security patch where a measure is developed against the fraudulent CAN control command (update software in which a measure is developed) is created, update of the software can be executed as needed.

Moreover, security device 100 according to one aspect of the present disclosure includes a specifier which specifies an ECU which can transmit a fraudulent CAN control command when the fraudulent CAN control command is detected in an in-vehicle communication network; an update instructor which causes ECU 220 specified to execute update of the software used by ECU 220 specified; and an update prohibition instructor which prohibits ECU 220 specified from executing update of the software after the update of the software is executed. One example of the specifier is fraudulent ECU specifier 130. One example of the update instructor is software update instructor 140. One example of the update prohibition instructor is software update invalidator 150.

Thereby, the same effects as those of the security method according to one aspect according to the present disclosure are obtained.

Other Embodiments

Although the security device and the like according to one or more aspects have been described above based on the embodiment, the present disclosure is not limited to the above embodiment. The present disclosure also covers a variety of modifications of the embodiment conceived by persons skilled in the art without departing from the gist of the present disclosure.

For example, although security device 100 is included in vehicle 200 in the above embodiment, security device 100 may be arranged outside vehicle 200.

Moreover, for example, security device 100 may include anomaly detector 210 and/or software updater 230.

Moreover, for example, security device 100 may obtain the update software and/or the update software in which a measure is developed by communicating with OTA server 400.

Moreover, for example, the information indicating that a measure has been developed against a fraudulent CAN control command may be the update software in which a measure is developed.

Moreover, for example, the update software and/or the update software in which a measure is developed may be transmitted from security device 100 to software updater 230.

Moreover, for example, vehicle 200 need not include storage 240 when it is communicably connected to OTA server 400. Moreover, for example, vehicle 200 need not be communicably connected to OTA server 400 when it includes storage 240 which preliminarily stores software (update software) used in update when ECU 220 is attacked.

Moreover, the software in rollback by ECU 220 may be stored in the memory included in ECU 220, or may be stored in a device different from ECU 220 such as storage 180 or storage 240.

Moreover, for example, in the above embodiment, processing executed by a specific processor may be executed by another processor. Moreover, order of a plurality of processings may be changed, or a plurality of processings may be executed in parallel.

Moreover, for example, in the above embodiment, the components of the processors may be configured with dedicated hardware, or may be implemented by executing software programs suitable for the components. The components may be implemented by a program executor, such as a CPU or a processor, which reads out and executes software programs recorded in a recording medium such as a hard disk or a semiconductor memory. Here, the programs for implementing the devices in the above embodiment cause a computer to execute the steps illustrated in the flowchart and the sequence diagram in FIGS. 4, 5, and 6, for example.

The present disclosure also covers the following cases.

(1) At least one device above is specifically a computer system configured with a microprocessor, a ROM, a RAM, a hard disk unit, a display unit, a keyboard, a mouse, and the like. The RAM or the hard disk unit stores a computer program. The microprocessor operates according to the computer program, and thereby, the at least one device achieves the function. Here, the computer program is configured with a combination of command codes indicating instructions to the computer to achieve predetermined functions.

(2) Part or all of the components constituting at least one device above may be configured with a single system large scale integration (LSI: large scale integrated circuit). The system LSI is an ultra multi-function LSI manufactured by integrating a plurality of components on a single chip, and is specifically a computer system configured with a microprocessor, a ROM, a RAM, and the like. The RAM stores a computer program. The microprocessor operates according to the computer program, and thereby, the system LSI achieves the function.

(3) Part or all of the components constituting at least one device above may be configured with an IC card or single module detachably attachable to the device. The IC card or the module is a computer system configured with a microprocessor, a ROM, a RAM, and the like. The IC card or the module may include the ultra multi-function LSI above. The microprocessor operates according to the computer program, and thereby, the IC card or the module achieves the function. This IC card or the module may have tamper proofness.

(4) The present disclosure may be the method illustrated above. Alternatively, the present disclosure may be a computer program for causing a computer to implement these methods, or may be digital signals generated by the computer program.

Alternatively, the present disclosure may be a computer program or digital signals recorded on a computer-readable recording medium, such as a flexible disc, a hard disk, a compact disc (CD)-ROM, a DVD, a DVD-ROM, a DVD-RAM, a Blu-ray(registered trademark) Disc) (BD), or a semiconductor memory. Alternatively, the present disclosure may be digital signals recorded on these recording media.

Alternatively, the present disclosure may be a computer program or digital signals transmitted through an electrical communication line, a wireless or wired communication line, a network such as the Internet, or data broadcasting.

Alternatively, the present disclosure may be implemented by another independent computer system by recording a program or digital signals on a recording medium and transporting the recording medium or by transporting the program or digital signals through a network or the like.

Further Information about Technical Background to this Application

The disclosure of the following patent application including specification, drawings, and claims are incorporated herein by reference in their entirety: Japanese Patent Application No. 2022-081617 filed on May 18, 2022.

INDUSTRIAL APPLICABILITY

The present disclosure is applicable to security devices which monitor cyberattacks in in-vehicle communication networks.

The invention claimed is:

1. A security method, comprising:
specifying an electronic control unit (ECU) which is configured to transmit a fraudulent command, when the fraudulent command is detected in an in-vehicle communication network;
causing the ECU to execute an update of software used by the ECU; and
prohibiting the ECU from executing a further update of the software, after the update of the software by the ECU is executed,
wherein the prohibiting of the ECU from executing the further update of the software is executed after verifying that an instruction for the prohibiting is a correct instruction, the instruction being verified as the correct instruction in response to the instruction being received from a predetermined device,
the prohibiting of the ECU from executing the further update of the software is maintained until a response to the fraudulent command is completed, and
the response to the fraudulent command includes preparation of distribution of patch software in which a vulnerability associated with the fraudulent command is addressed.

2. The security method according to claim 1, wherein information used in the update of the software is stored in a storage included in a vehicle where the ECU is included.

3. The security method according to claim 1, wherein the causing of the ECU to execute the update of the software includes causing the ECU to execute rollback of the software.

4. The security method according to claim 1, further comprising:
when, after the prohibiting of the ECU from executing the further update of the software, information indicating that a measure has been developed against the fraudulent command is obtained, enabling the ECU to execute the further update of the software.

5. A security device, comprising:
a specification circuit which specifies an electronic control unit (ECU) which is configured to transmit a fraudulent command, when the fraudulent command is detected in an in-vehicle communication network;
an update instruction circuit which causes the ECU to execute an update of software used by the ECU; and
an update prohibition instruction circuit which prohibits the ECU from executing a further update of the software, after the update of the software by the ECU is executed,
wherein the update prohibition instruction circuit prohibits the ECU from executing the further update of the software after verifying that an instruction for prohibiting execution of the further update is a correct instruction, the instruction being verified by the update prohibition instruction circuit as the correct instruction in response to the instruction being received from a predetermined device,
the update prohibition instruction circuit maintains the prohibiting of the ECU from executing the further update of the software until a response to the fraudulent command is completed, and
the response to the fraudulent command includes preparation of distribution of patch software in which a vulnerability associated with the fraudulent command is addressed.

6. A security device, comprising:
a processor; and
a memory including at least one program that, when executed by the processor, causes the processor to perform functions, the functions including:
specifying an electronic control unit (ECU) which is configured to transmit a fraudulent command, when the fraudulent command is detected in an in-vehicle communication network;
causing the ECU to execute an update of software used by the ECU; and
prohibiting the ECU from executing a further update of the software, after the update of the software by the ECU is executed,
wherein the processor prohibits the ECU from executing the further update of the software after verifying that an instruction for prohibiting execution of the further update is a correct instruction, the instruction being verified as the correct instruction in response to the instruction being received from a predetermined device,
the processor maintains the prohibiting of the ECU from executing the further update of the software until a response to the fraudulent command is completed, and
the response to the fraudulent command includes preparation of distribution of patch software in which a vulnerability associated with the fraudulent command is addressed.

7. The security method according to claim 1, wherein the causing of the ECU to execute the update of the software includes causing the ECU to execute a roll-back of the software, whereby the software of the ECU is updated to a prior state before the fraudulent com- mand is detected and without a security patch for the fraudulent command being prepared.

8. The security method according to claim 7, further comprising:

after the prohibiting of the ECU from executing the further update of the software, enabling the ECU to execute the further update of the software in response to the security patch being developed.

9. The security method according to claim 1, further comprising:

storing information regarding commands which are con- figured to be transmitted by a plurality of ECUs, wherein the ECU which is specified as transmitting the fraudulent command is configured to transmit only specific commands of the commands which are con- figured to be transmitted by the plurality of ECUs.

10. The security method according to claim 9, wherein the ECU which is specified as transmitting the fraudulent command is configured at a hardware level, amongst the plurality of ECUs.

11. The security method according to claim 1, wherein the causing of the ECU to execute the update of the software includes causing the ECU to change software used to previously update the software.

12. The security method according to claim 1, wherein the causing of the ECU to execute the update of the software includes causing the ECU to invalidate a previous update of the software.

13. The security method according to claim 1, wherein the prohibiting of the ECU from executing the further update of the software is executed until an instruction to enable update of the software is received.

14. The security method according to claim 13, wherein the prohibiting of the ECU from executing the further update of the software is executed until the instruction to enable update of the software is received, even when an instruction to update the software is obtained.

15. The security method according to claim 1, wherein the correct instruction for the prohibiting includes an authentication key exchange (AKE) protocol using a private-key cipher or a public-key cipher.

16. The security method according to claim 1, wherein the prohibiting of the ECU from executing the further update of the software is maintained until information indicating that a countermeasure against the fraudulent command has been obtained.

* * * * *